United States Patent
Chen et al.

(10) Patent No.: US 10,721,119 B2
(45) Date of Patent: Jul. 21, 2020

(54) CROSS-CARRIER INDICATION OF UPLINK/DOWNLINK SUBFRAME CONFIGURATIONS

(71) Applicants: QUALCOMM INCORPORATED, San Diego, CA (US); Wanshi Chen, San Diego, CA (US); Chao Wei, Beijing (CN); Peter Gaal, San Diego, CA (US); Hao Xu, San Diego, CA (US); Neng Wang, Beijing (CN)

(72) Inventors: Wanshi Chen, San Diego, CA (US); Chao Wei, Beijing (CN); Peter Gaal, San Diego, CA (US); Hao Xu, San Diego, CA (US); Neng Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 15/028,805

(22) PCT Filed: Oct. 28, 2014

(86) PCT No.: PCT/CN2014/089670
§ 371 (c)(1),
(2) Date: Apr. 12, 2016

(87) PCT Pub. No.: WO2015/062472
PCT Pub. Date: May 7, 2015

(65) Prior Publication Data
US 2016/0254948 A1    Sep. 1, 2016

(30) Foreign Application Priority Data

Oct. 30, 2013    (WO) ................ PCT/CN2013/086229

(51) Int. Cl.
*H04L 12/24*     (2006.01)
*H04W 72/04*    (2009.01)
(Continued)

(52) U.S. Cl.
CPC ........ *H04L 41/0803* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

| | | |
|---|---|---|
| 2011/0105050 A1 | 5/2011 | Khandekar et al. |
| 2012/0147810 A1 | 6/2012 | Wang et al. |

(Continued)

FOREIGN PATENT DOCUMENTS

| | | |
|---|---|---|
| CN | 102158976 A | 8/2011 |
| CN | 102420685 A | 4/2012 |

(Continued)

OTHER PUBLICATIONS

Details of Signaling for TDD UL-DL configuration, 3GPP TSG RAN WG1 Meeting #74, R1-133051, Aug. 19-23, 2013.*

(Continued)

*Primary Examiner* — Peter Chen
*Assistant Examiner* — Jeff Banthrongsack
(74) *Attorney, Agent, or Firm* — Patterson + Sheridan LLP

(57) ABSTRACT

Certain aspects of the present disclosure relate to techniques for cross-carrier indication of TDD (Time Division Duplex) UL (Uplink)/DL (Downlink) subframe configuration. A UE may receive a configuration of a first index for a first cell, wherein the first index is mapped to a first position in a Downlink Control Information (DCI) message. The UE may (Continued)

receive the DCI message in a subframe and determine an indication of a UL/DL subframe configuration for the first cell based on the first index and the DCI message. The UE may communicate with the first cell based on the determined UL/DL subframe configuration for the first cell.

30 Claims, 12 Drawing Sheets

(51) Int. Cl.
H04L 5/14 (2006.01)
H04L 5/00 (2006.01)
(52) U.S. Cl.
CPC .............. *H04L 5/14* (2013.01); *H04L 5/1469* (2013.01); *H04W 72/042* (2013.01); *H04W 72/0446* (2013.01); *H04L 41/12* (2013.01)

(56) References Cited

U.S. PATENT DOCUMENTS

| | | | |
|---|---|---|---|
| 2013/0155898 A1* | 6/2013 | Yin ..................... | H04L 1/0026 370/254 |
| 2013/0194981 A1* | 8/2013 | Wang .................. | H04L 1/1671 370/280 |
| 2013/0272170 A1 | 10/2013 | Chatterjee et al. | |
| 2014/0003356 A1* | 1/2014 | Wang ................ | H04W 72/1289 370/329 |
| 2014/0064233 A1 | 3/2014 | Oizumi et al. | |

FOREIGN PATENT DOCUMENTS

| | | |
|---|---|---|
| CN | 102714567 A | 10/2012 |
| WO | 2013018639 A1 | 2/2013 |
| WO | 2015007208 A1 | 1/2015 |

OTHER PUBLICATIONS

International Search Report and Written Opinion—PCT/CN2013/086229—ISA/EPO—dated Aug. 4, 2015.
3GPP Draft: "Summary of AD-HOC Session on Further Enhancements to LTE TDD for DL-UL Interference Management and Traffic Adaptation," 3rd Generation Partnership Project (3GPP), Mobile Competence Centre, Oct. 11, 2013 (Oct. 11, 2013), XP050768834, Retrieved from the Internet: URL:http://www.3gpp.org/ftp/tsg ran/WG1 RL1/TSGR1_74b/Docs/ - - [retrieved on Oct. 11, 2013].
CATT: "Design of L1 Signaling for UL-DL Reconfiguration," 3GPP Draft; R1-134082, 3rd Generation Partnership Project (3GPP), Mobile Competence Centre ; 650, Route Des Lucioles ; F-06921 Sophia-Antipolis Cedex ; France vol. RAN WG1, No. Guangzhou, China; Oct. 7, 2013-Oct. 11, 2013 Sep. 28, 2013 (Sep. 28, 2013), XP050717274, Retrieved from the Internet: URL:http://www.3gpp.org/ftp/tsg_ran/WG1_RL1/TSGR1_74b/Docs/ [retrieved on Sep. 28, 2013].
Intel Corporation: "Discussion on Signaling Mechanism for TDD UL-DL Reconfiguration," 3GPP Draft; R1-134123, 3rd Generation Partnership Project (3GPP), Mobile Competence Centre ; 650, Route Des Lucioles ; F-06921 Sophia-Antipolis Cedex ; France, vol. RAN WG1, No. Guangzhou, China; Oct. 7, 2013-Oct. 11, 2013 Sep. 28, 2013 (Sep. 28, 2013), XP050717313, Retrieved from the Internet: URL:http://www.3gpp.org/ftp/tsg ran/WG1 RL1/TSGR1_74b/Docs/ - - [retrieved on Sep. 28, 2013].
LG Electronics: "Details of UL-DL Reconfiguration Message," 3GPP Draft; R1-134387 Details of UL-DL Reconfiguration Message LG, 3rd Generation Partnership Project (3GPP), Mobile Competence Centre ; 650, Route Des Lucioles; F-06921 Sophia-Antipolis Cedex ; FRAN, vol. RAN WG1, No. Guangzhou, China; Oct. 7, 2013-Oct. 11, 2013 Sep. 28, 2013 (Sep. 28, 2013), XP050717512, Retrieved from the Internet: URL:http://www.3gpp.org/ftp/tsg ran/WG1 RL1/TSGR1 74b/Docs/ - - [retrieved on Sep. 28, 2013].
Supplementary European Search Report—EP14857661—Search Authority—The Hague—dated Jun. 14, 2017.
ZTE: "Details of Signaling for TDD UL-DL configuration," 3GPP Draft; R1-133051 Details of Signaling for TDD UL-DL Reconfiguration, 3rd Generation Partnership Project (3GPP), Mobile Competence Centre; 650, Route Des Lucioles ; F-06921 Sophia-Antipolis Cedex, vol. RAN WG1, No. Barcelona, Spain; Aug. 19, 2013-Aug. 23, 2013 Aug. 10, 2013 (Aug. 10, 2013), XP050716279, Retrieved from the Internet: URL:http://www.3gpp.org/ftp/tsg ran/WG1 RL1/TSGR1 74/Docs/ - - [retrieved on Aug. 10, 2013].
International Search Report and Written Opinion for PCT/CN2014/089670, dated Jan. 28, 2015.
Huawei: "Improvements on Control Channel for Carrier Aggregation [online]", 3GPP TSG RAN WG 1 Meeting # 58, R1-093048, Shenzhen, China, Aug. 24-28, 2009, Internet: URL: https://www.3gpp.org/ftp/tsg_ran/WG1_RL1/TSGR1_58/Docs/R1-093048.zip , Aug. 18, 2009, 4 Pages.

\* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 8

CROSS-CARRIER INDICATION OF UPLINK/DOWNLINK SUBFRAME CONFIGURATIONS

CLAIM OF PRIORITY

The present Application for Patent claims priority to International application No. PCT/CN2013/086229 filed Oct. 30, 2013, and assigned to the assignee hereof and expressly incorporated herein by reference.

BACKGROUND

Field

The present disclosure relates generally to wireless communication and, more particularly, to methods and apparatus for dynamic indication of Time Division Duplex (TDD) Uplink (UL)/Downlink (DL) subframe configurations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes receiving a configuration of a first index for a first cell, wherein the first index is mapped to a first position in a Downlink Control Information (DCI) message, receiving the DCI message in a subframe, determining an indication of a UL/DL subframe configuration for the first cell based on the first index and the DCI message, and communicating with the first cell based on the determined UL/DL subframe configuration for the first cell.

Certain aspects of the present disclosure provide a method for wireless communications by a base station. The method generally includes generating a Downlink control Information (DCI) message comprising UL/DL subframe configuration information for a first set of groups of cells at different positions within the DCI message, and transmitting the DCI message to the at least one UE configured to communicate using at least one of the groups of cells.

Aspects generally include methods, apparatus, systems, computer program products, and processing systems, as substantially described herein with reference to and as illustrated by the accompanying drawings. "LTE" refers generally to LTE and LTE-Advanced (LTE-A).

BRIEF DESCRIPTION OF THE DRAWINGS

FIG. 8 illustrates UL/DL subframe configurations used by LTE TDD.

DETAILED DESCRIPTION

Figure 1:
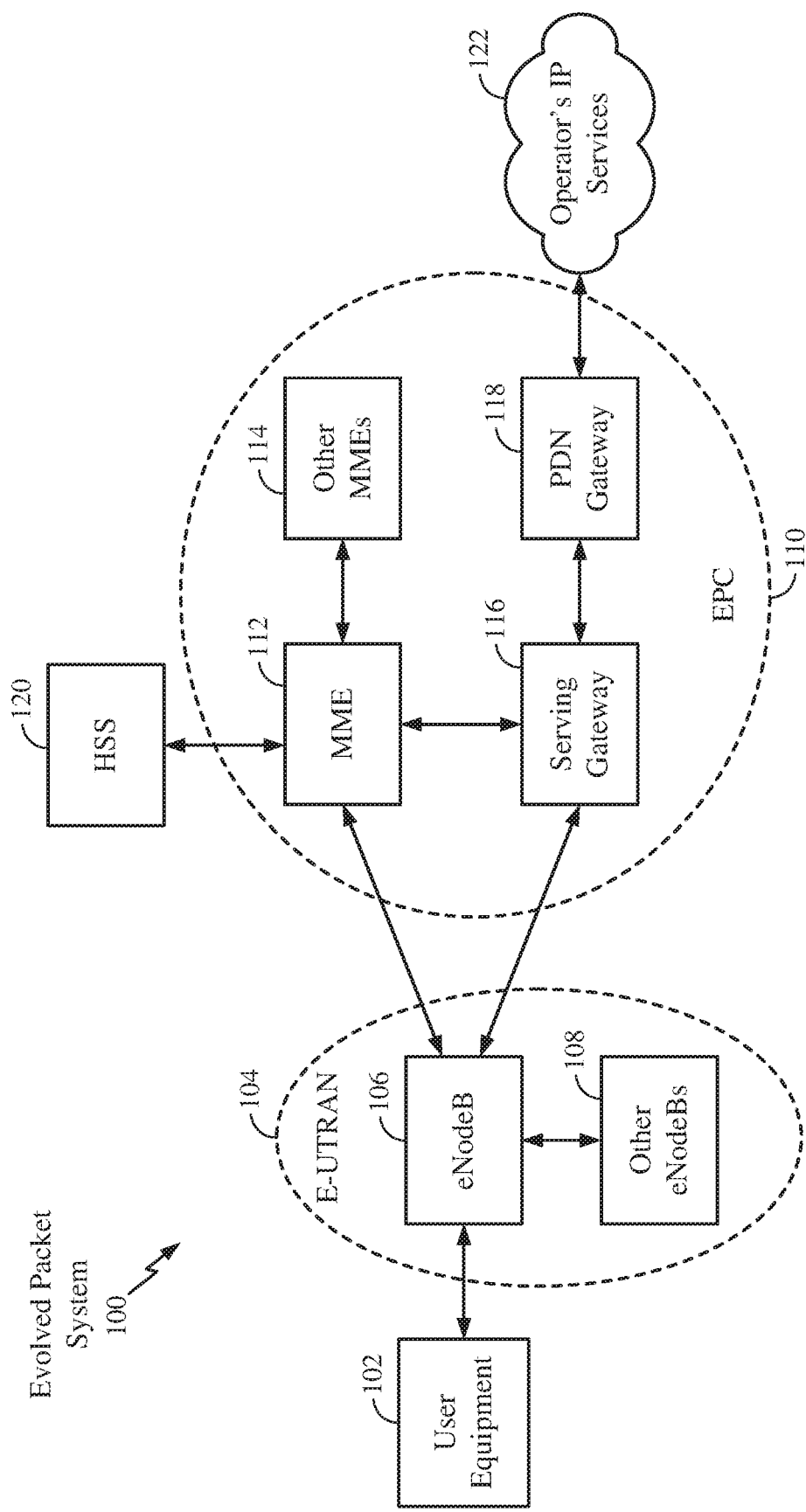
FIG. 1 is a diagram illustrating an example of a network architecture.

In certain aspects, one or more of the evolved nodeBs (eNBs) may indicate to one or more user equipments UEs an uplink (UL)/downlink (DL) configuration (e.g., numbers and positions of UL and DL subframes in a frame) to be used in one or more cells via explicit signaling. This type of signaling may particularly be useful when a cell is enabled for evolved interference management for traffic adaption (eIMTA), which enables the cell to change its UL/DL configuration based on traffic needs. eIMTA is discussed in detail in the following paragraphs. In certain aspects, carrier aggregation is used in LTE for increasing operating bandwidth.

For example, a UE may be configured with two or more component carriers (CCs). One or more of the CCs may be eIMTA enabled. According to certain aspects of the present disclosure discussed below, cross-carrier indication of the UL/DL configurations for the eIMTA enabled CCs may be based on a group of CCs instead of one indicator for each CC. Further, as discussed below multiple UL/DL configuration indicators for multiple groups of CCs may be included in the same reconfiguration DCI (Downlink Control Information). However, the UE may need to monitor control information only for a subset of the groups included in the DCI. Certain aspects of the present disclosure discuss techniques to enable the UE to determine positions of the control information for the subset of the CC groups to be used by the UE from the received DCI.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, as indicated above, one or more eNBs 106 and 108 may generate and transmit a DCI to indicate to one or more UEs (e.g., UE 102) an uplink (UL)/downlink (DL) subframe configuration to be used in one or more cells via explicit signaling. Further, the eNBs 106 and 108, and the UE 102 may be configured to implement techniques for cross carrier indication of UL/DL subframe configurations as discussed in detail below, in accordance with certain aspects of the present disclosure. For example, one or more of the eNBs 106 and 108 may be configured to include indications of UL/DL configurations for several groups of CCs in one DCI message, and the UE 206 may be configured to determine positions within the DCI message that include UL/DL configurations for a set of groups of CCs configured for the UE 206.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultra book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
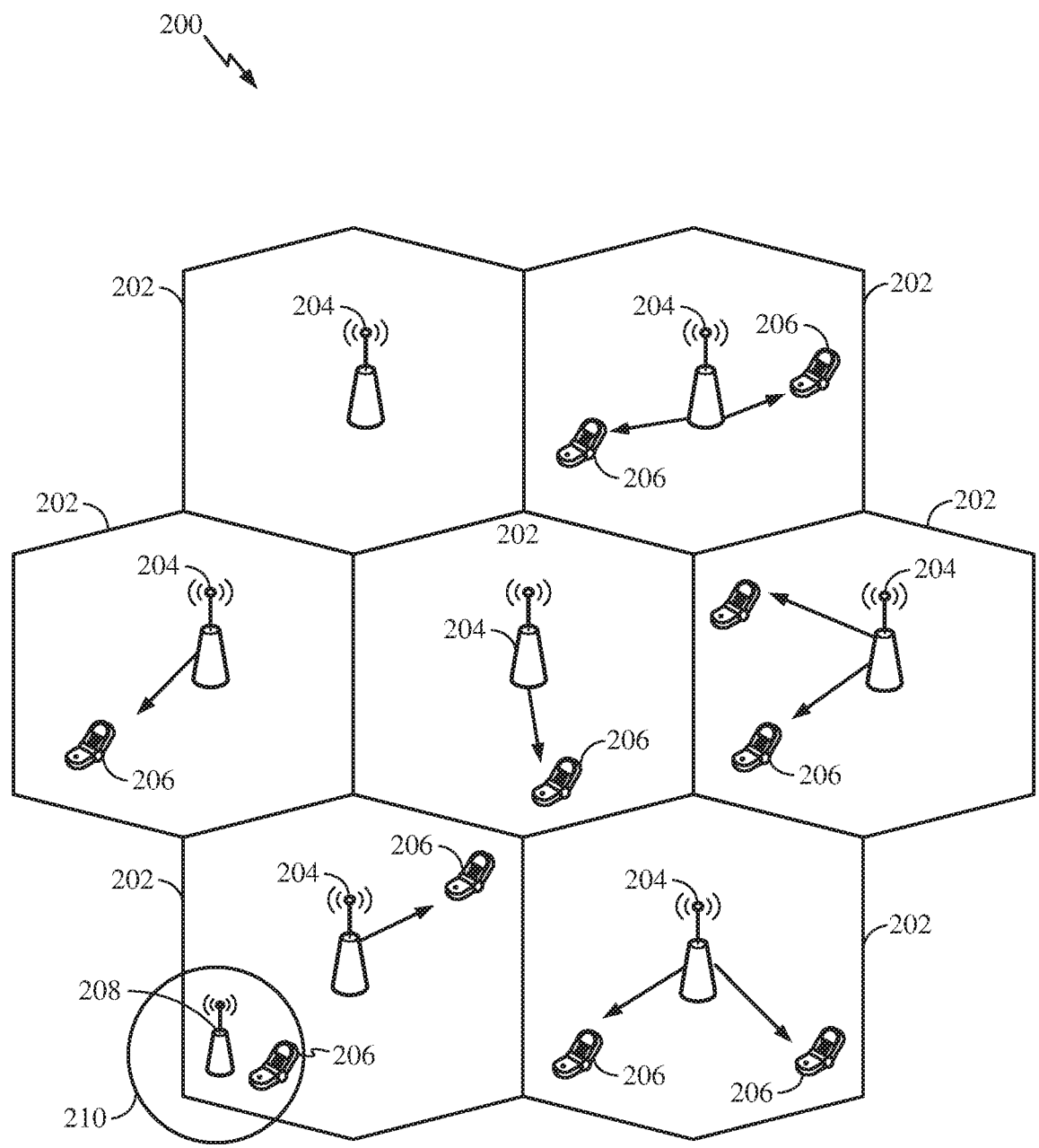
FIG. 2 is a diagram illustrating an example of an access network.

FIG. 2 is a diagram illustrating an example of an access network 200 in an LTE network architecture in which aspects of the present disclosure may be practiced. eNBs 204 and UEs 206 may be configured to implement techniques for cross carrier indication of UL/DL configuration in accordance with certain aspects of the present disclosure as discussed below.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
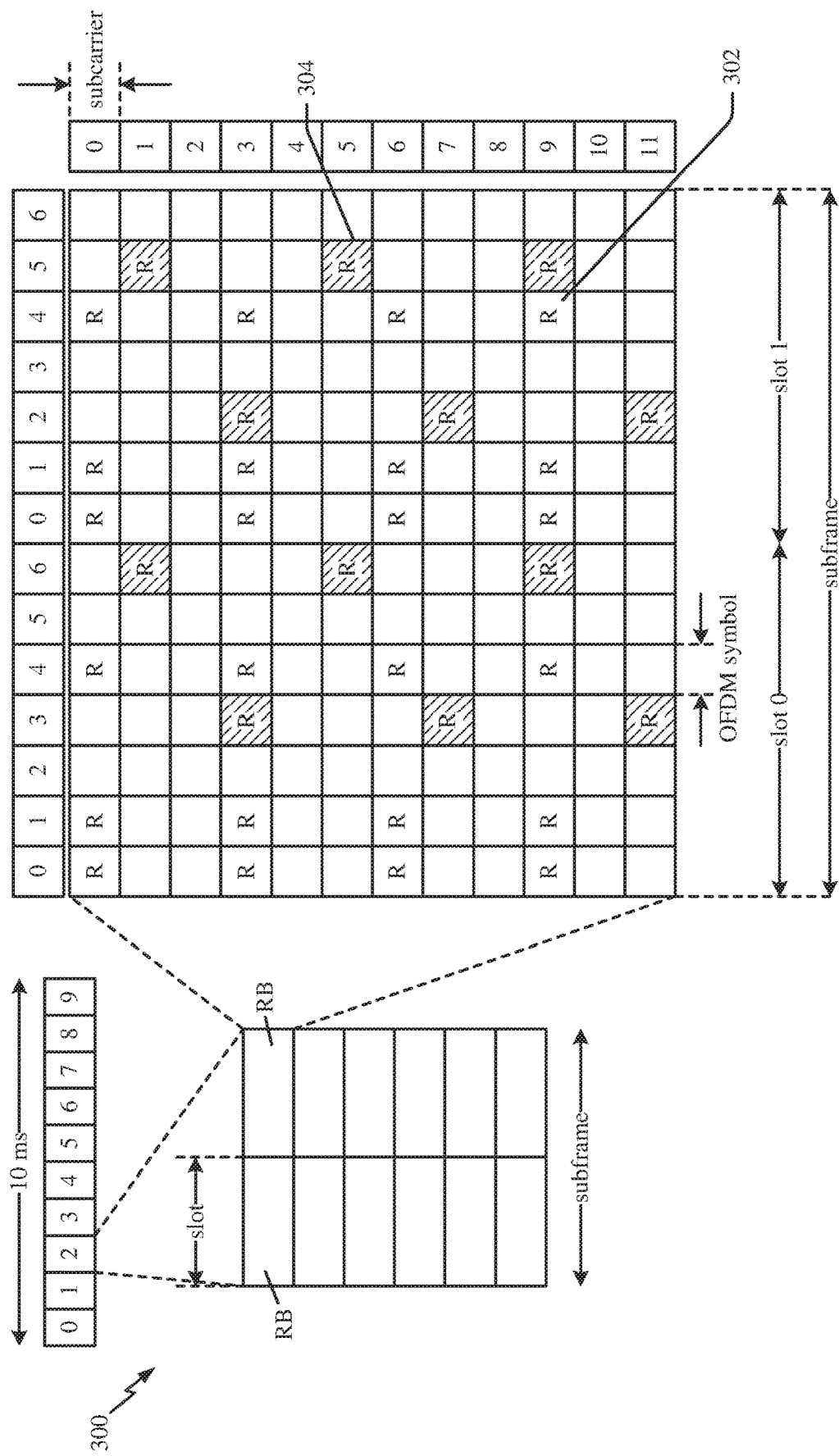
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
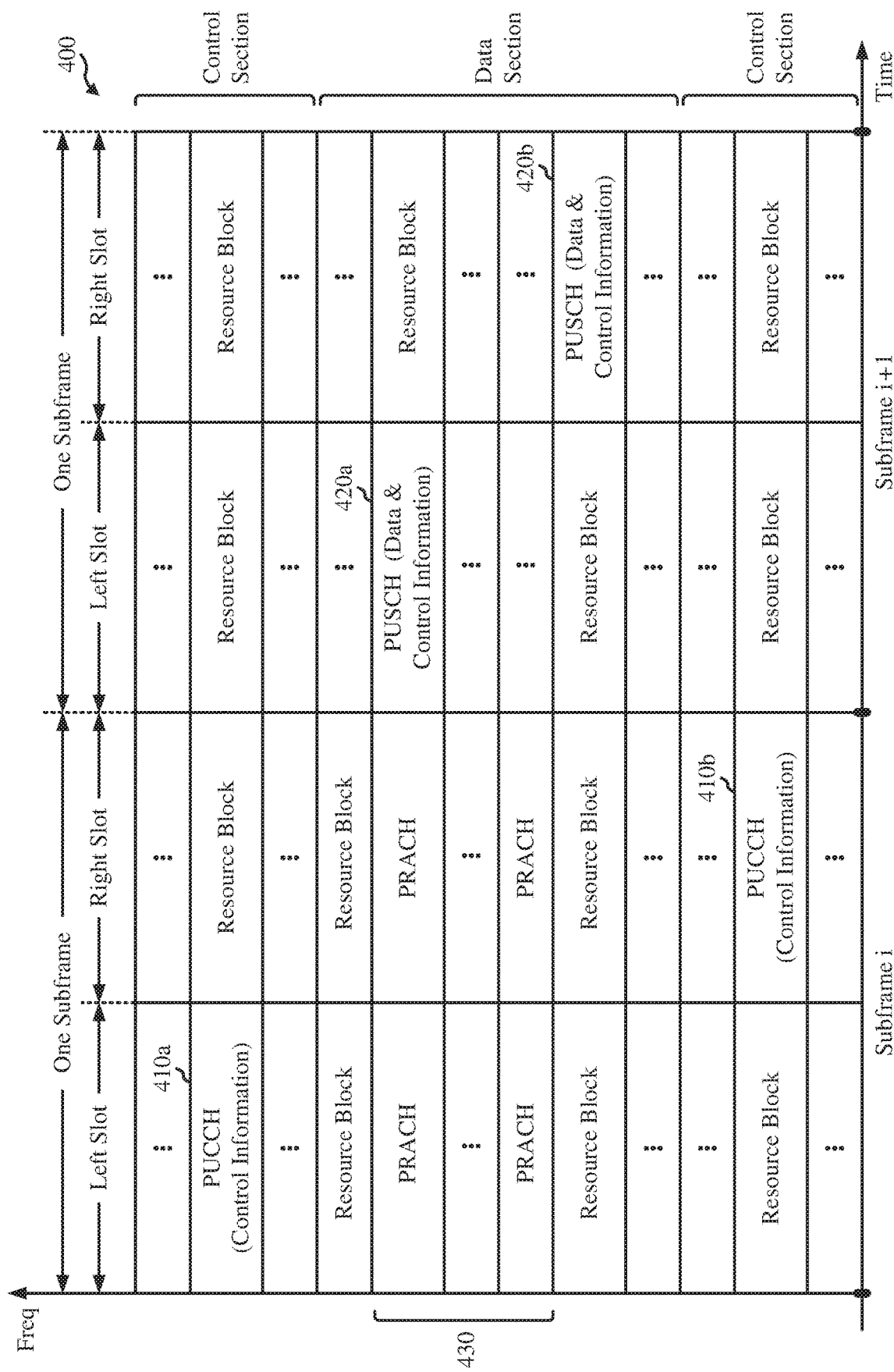
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
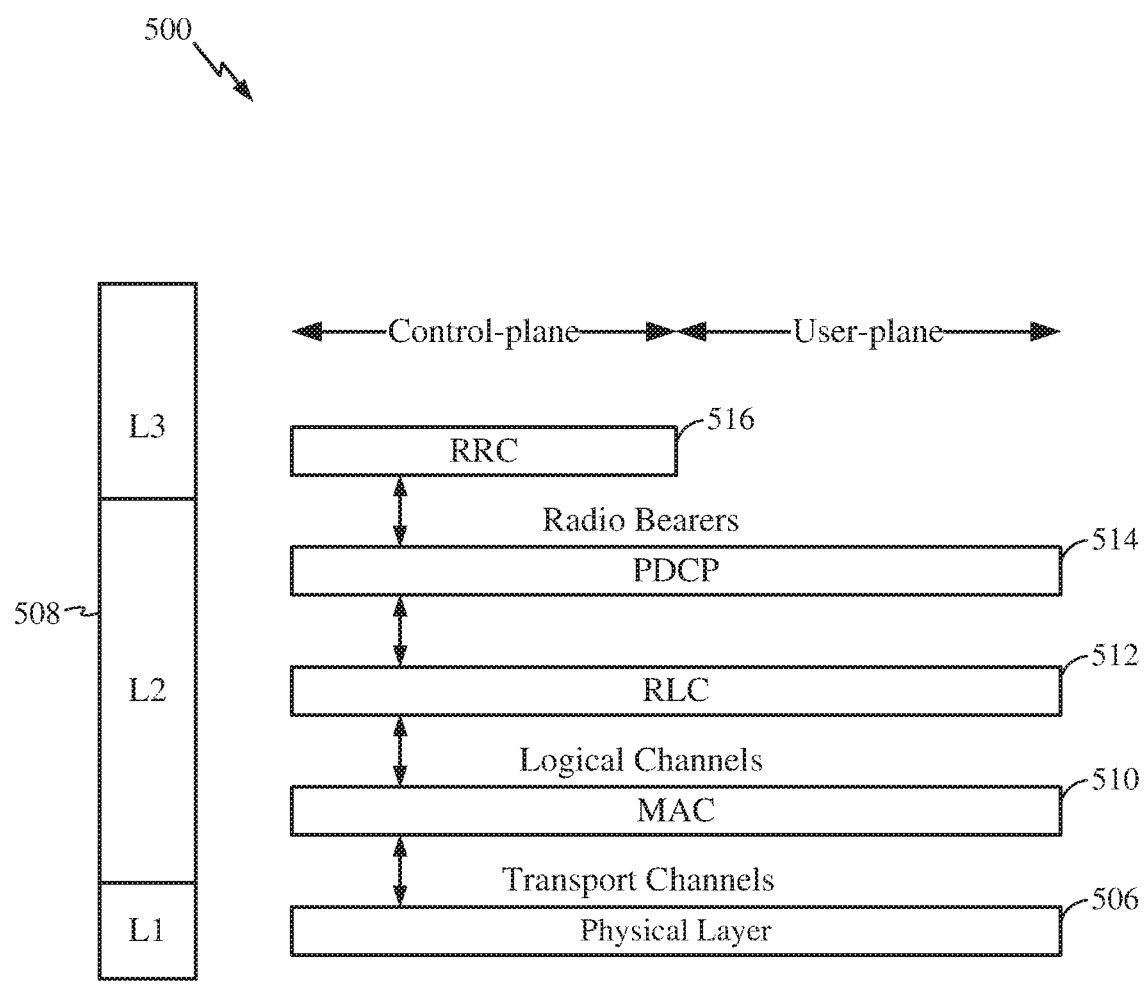
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNB s. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
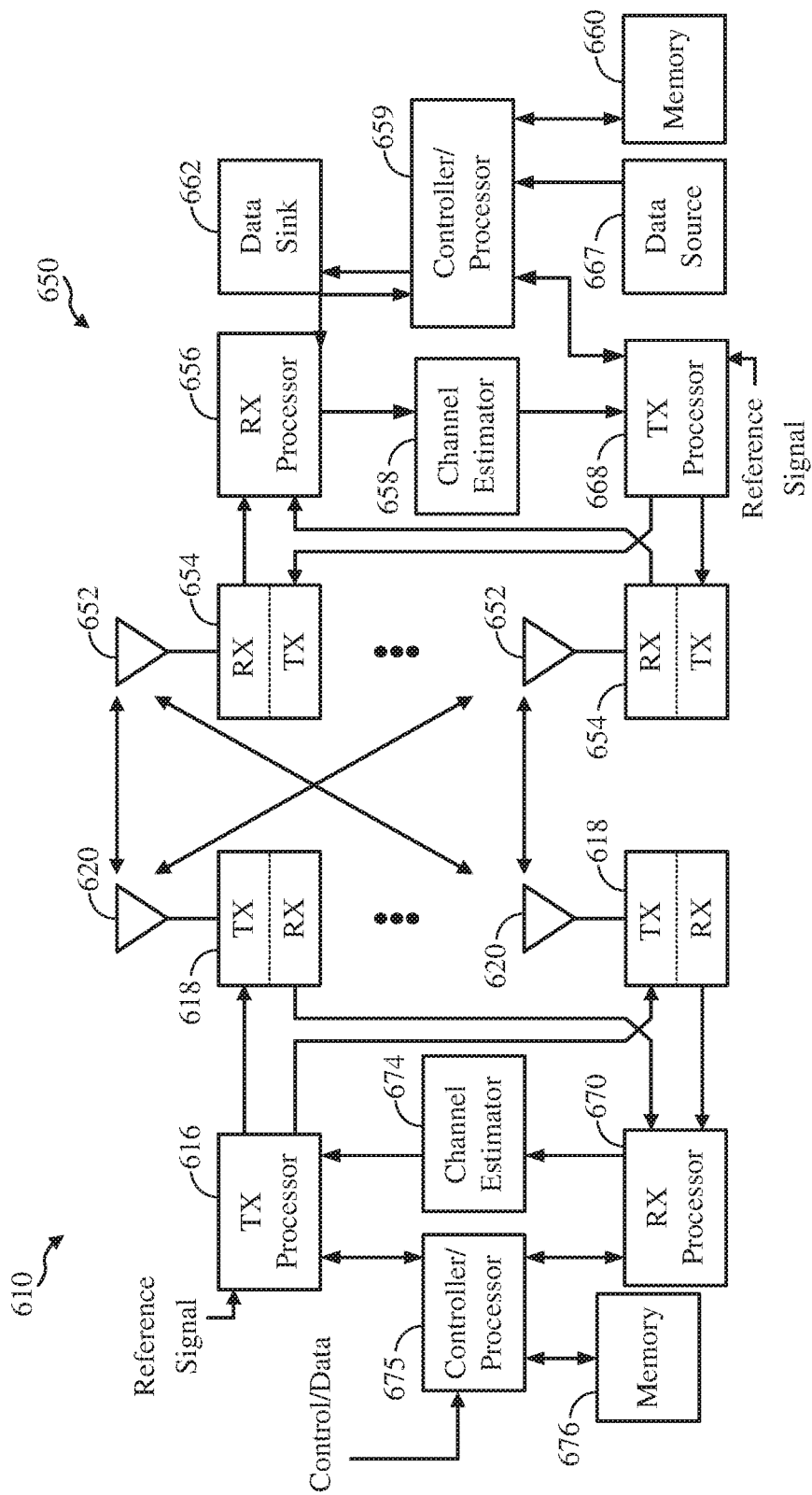
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

For example, the eNB 610 may generate and transmit a DCI to indicate to the UE 650 and UL/DL subframe configuration to be used in one or more cells via explicit signaling. Further the eNB 610 and the UE 650 may be configured to implement techniques for cross carrier indication of UL/DL subframe configurations as discussed in detail below, in accordance with certain aspects of the present disclosure. For example, the eNB 610 may be configured to include indications of UL/DL configurations for several groups of CCs in one DCI message, and the UE 650 may be configured to determine positions within the DCI message that include UL/DL configurations for a set f groups of CCs configured for the UE 650.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Figure 11:
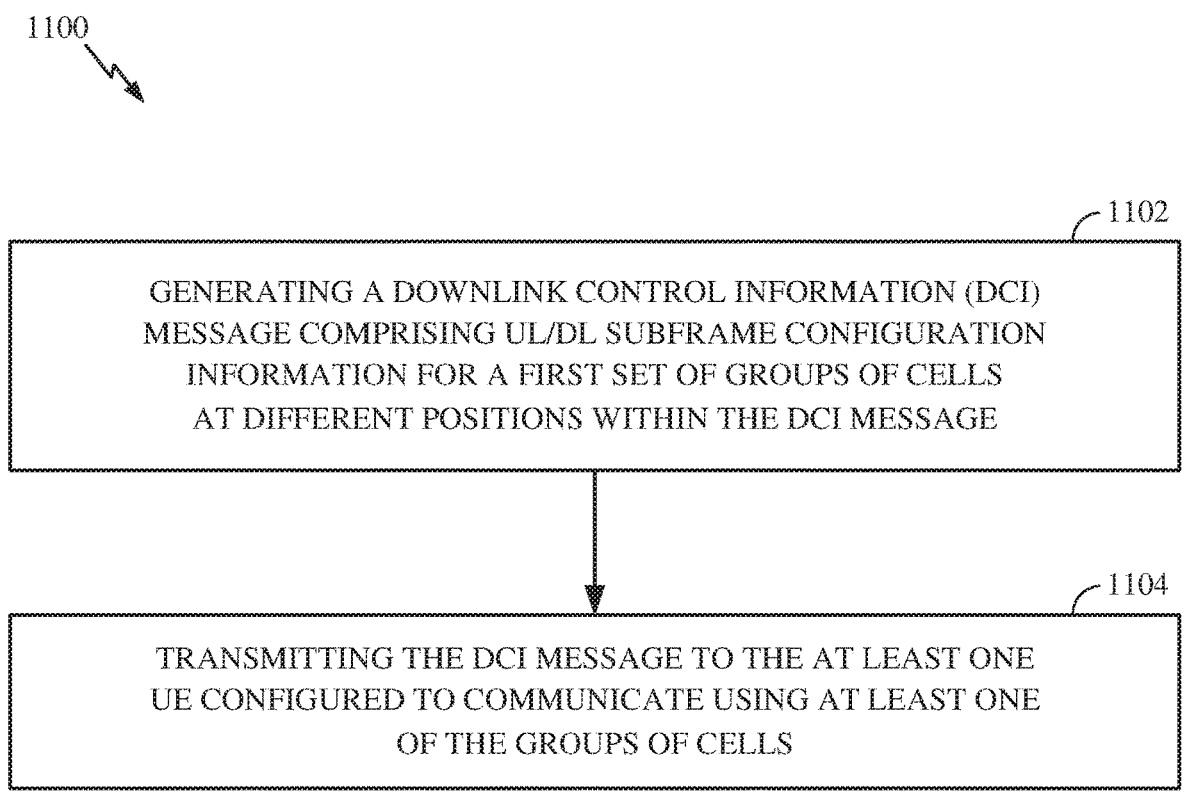
FIG. 11 illustrates example operations 1100 performed, for example, by a UE for cross-carrier indication of UL/DL subframe configuration, in accordance with certain aspects of the present disclosure.

The controller/processor 675 and/or other processors and modules at the eNB 610 may perform or direct operations, for example, operations 1100 in FIG. 11, and/or other processes for the techniques described herein for scheduling cross-carrier indication of UL/DL configuration. The controller/processor 659 and/or other processors and modules at the UE 650 may perform or direct operations, for example, operations 1200 in FIG. 12, and/or other processes for the techniques described herein for receiving and processing cross-carrier indication of UL/DL configurations. In certain aspects, one or more of any of the components shown in FIG. 6 may be employed to perform example operations 1100 and 1200 and/or other processes for the techniques described herein. The memories 660 and 676 may store data and program codes for the UE 650 and eNB 610 respectively, accessible and executable by one or more other components of the UE 650 and the eNB 610.

Evolved Interference Management for Traffic Adaptation (EIMTA)

Figure 7:
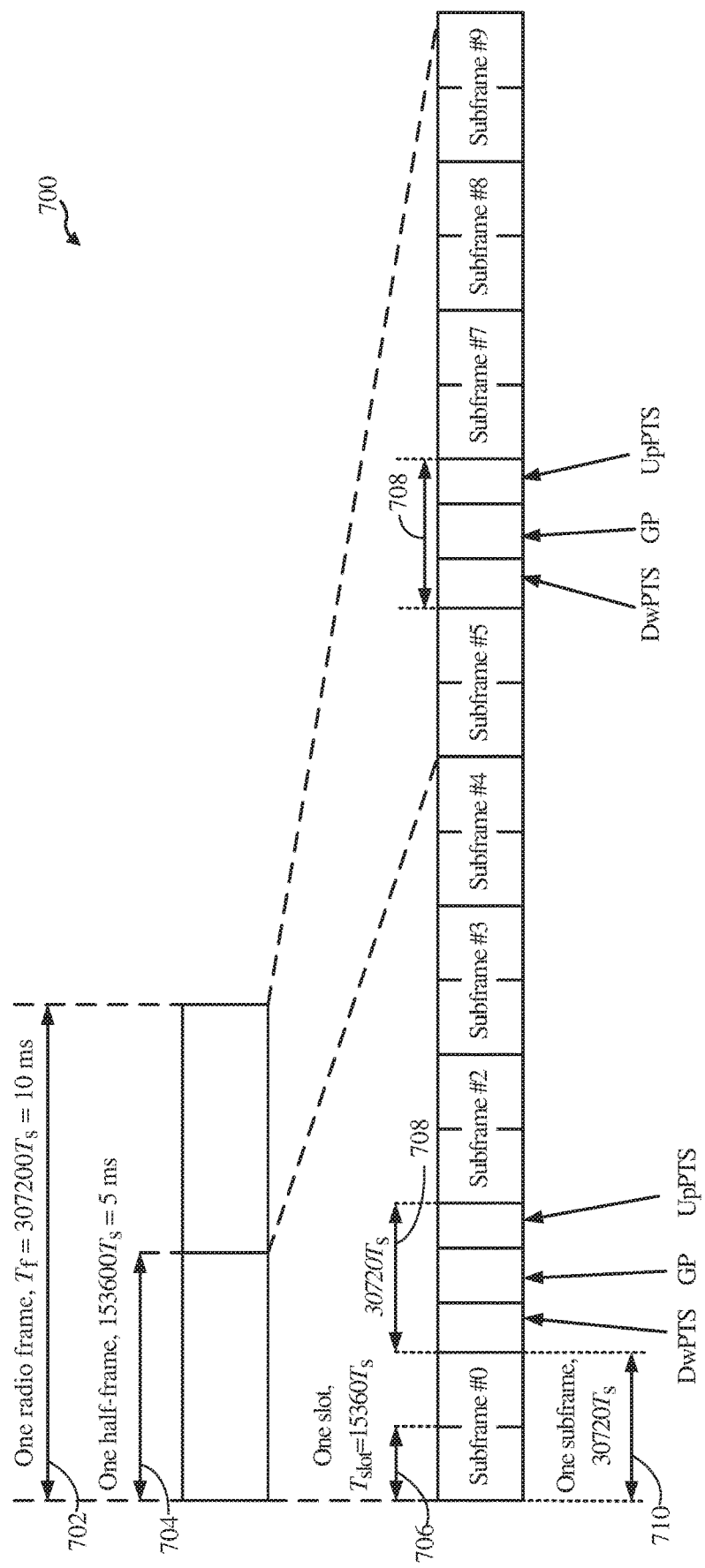
FIG. 7 illustrates an example frame structure for LTE time division duplex (TDD).

In certain wireless communications networks, such as LTE networks, both Frequency Division Duplex (FDD) and (TDD) frame structures may be supported. FIG. 7 shows an example frame structure 700 for LTE TDD.

As shown in FIG. 7, the 10 ms radio frame 702 consists of two half frames 704 of equal length (e.g., 5 ms), with each half frame consisting of 10 slots or 8 slots (e.g. slot 706) plus three special fields DwPTS (downlink pilot time slot, GP (guard period), and UpPTS (uplink pilot time slot) in a special subframe 708. Each slot 706 is 0.5 ms in length and two consecutive slots form exactly one subframe 710.

Within a radio frame, LTE TDD switches multiple times between downlink and uplink transmission and vice versa. The guard period (GP) is inserted between DwPTS and UpPTS when switching from the downlink to the uplink. The duration of the GP depends on the signal propagation time from a base station to a mobile station and back, as well as the time the mobile station requires to switch from receiving to sending. The lengths of the individual special fields depend on an uplink/downlink configuration selected by the network, but the total length of the three special fields remains constant at 1 ms.

In LTE TDD, transmission directions are separated by carrying the UL and DL data in different subframes. 7 possible DL and UL subframe configurations are supported, as shown in Table 800 of FIG. 8.

As shown in column 802 of table 800, the 7 UL/DL configurations are identified by indices 0-6. As shown in column 806, a "D" in a subframe indicates DL data transmission, "U" indicates UL data transmission, and "S" indicates a special subframe having special fields DwPTS, GP, and UpPTS as discussed above with reference to FIG. 7. As shown in column 804, there are 2 switching periodicities, 5 ms and 10 ms. For 5 ms periodicity, there are two special subframes in one 10 ms frame—as illustrated in FIG. 7. For 10 ms periodicity, there is one special subframe in one frame. The present methods and apparatus may be employed when a larger or smaller number of subframe configurations are supported.

In LTE Rel-12, it is possible to dynamically adapt TDD DL/UL subframe configurations based on the actual traffic needs, also known as evolved interference management for traffic adaptation (eIMTA). For example, if during a short duration, a large data burst on downlink is needed, the subframe configuration may be changed, for example, from config #1 (6 DL: 4 UL) to config #5 (9 DL: 1 UL) shown in FIG. 8. In some cases, the adaptation of TDD subframe configuration is expected to be no slower than 640 ms. In an extreme case, the adaptation may be expected to be as fast as 10 ms, although this may not be desirable.

This adaptation, however, may cause overwhelming interference to both downlink and uplink when two or more cells have different downlink and uplink subframes. In addition, the adaptation may cause some complexity in DL and UL HARQ timing management. For instance, each of the seven DL/UL subframe configurations as shown in FIG. 8 has its own DL/UL HARQ timing. Further, the DL/UL HARQ timing is optimized for each configuration (e.g., in terms of HARQ operation efficiency). The timing from PDSCH to the corresponding ACK/NAK may be different for different TDD DL/UL subframe configurations (e.g., depending on when the next available uplink subframe occurs for sending the ACK/NAK).

Thus, dynamic switching among the seven configurations (or even more, if more flexible adaptation is deemed as necessary) implies that if current DL/UL HARQ timing is kept, there may be missed ACK/NAK transmission opportunities for some of the DL or UL transmissions.

In certain aspects, explicit layer 1 signaling may be used for indicating the dynamic UL/DL subframe configuration or re-configuration to the UE. For example, the configuration may be indicated to the UE via a UE group common control channel (e.g., PDCCH as discussed above with reference to FIG. 3 or ePDCCH) included in an explicit reconfiguration DCI (Downlink Control Information). In an aspect, this control channel may be scrambled by at least one new radio network temporary identifier (RNTI) (e.g., eIMTA-RNTI). In certain aspects, for each UL/DL configuration, the control channel may carry 3 bits to explicitly indicate one of the seven TDD UL/DL configurations, different combinations of the 3 bits indicating different UL/DL subframe configurations. In an aspect, this group common re-configuration DCI may be transmitted at least in the Primary cell (Pcell) PDCCH CSS (common search space).

In certain aspects, if a UE is configured with two or more eIMTA-enabled cells, the UE may be indicated by one explicit re-configuration DCI for the two or more eIMTA-enabled cells, if the DCI is transmitted in the Pcell PDCCH CSS. That is one DCI may carry re-configuration indicators for two or more cells transmitted in the CSS if UE is configured with these two or more cells that are eIMTA-capable. In this case, two or more indicators (e.g., each of 3-bits) for the corresponding two or more eIMTA-enabled cells may be included in the one explicit re-configuration DCI for the UE configured with the two or more eIMTA-enabled cells, if the DCI is transmitted in the Pcell PDCCH CSS. In an aspect, the UE may monitor the CSS in one or more cells. Further, the UE may monitor the CSS in a subset of downlink subframes in a cell.

Example Cross-Carrier Indication of UL/DL Subframe Configuration

According to certain aspects of the present disclosure, carrier aggregation (CA) may be used in LTE-A in order to increase the bandwidth. Carrier aggregation may be used regardless of whether a system utilizes TDD and FDD. Each aggregated carrier is referred to as a component carrier (CC). The component carrier may have a bandwidth of 1.4, 3, 5, 10, 15 or 20 MHz and a maximum of five component carriers may be aggregated, hence a maximum bandwidth of 100 MHz may be achieved. The carrier may be allocated intra-band, i.e., the component carriers belong to the same operating frequency band, or may be inter-band, in which case the component carriers belong to different operating frequency bands.

Figure 9:
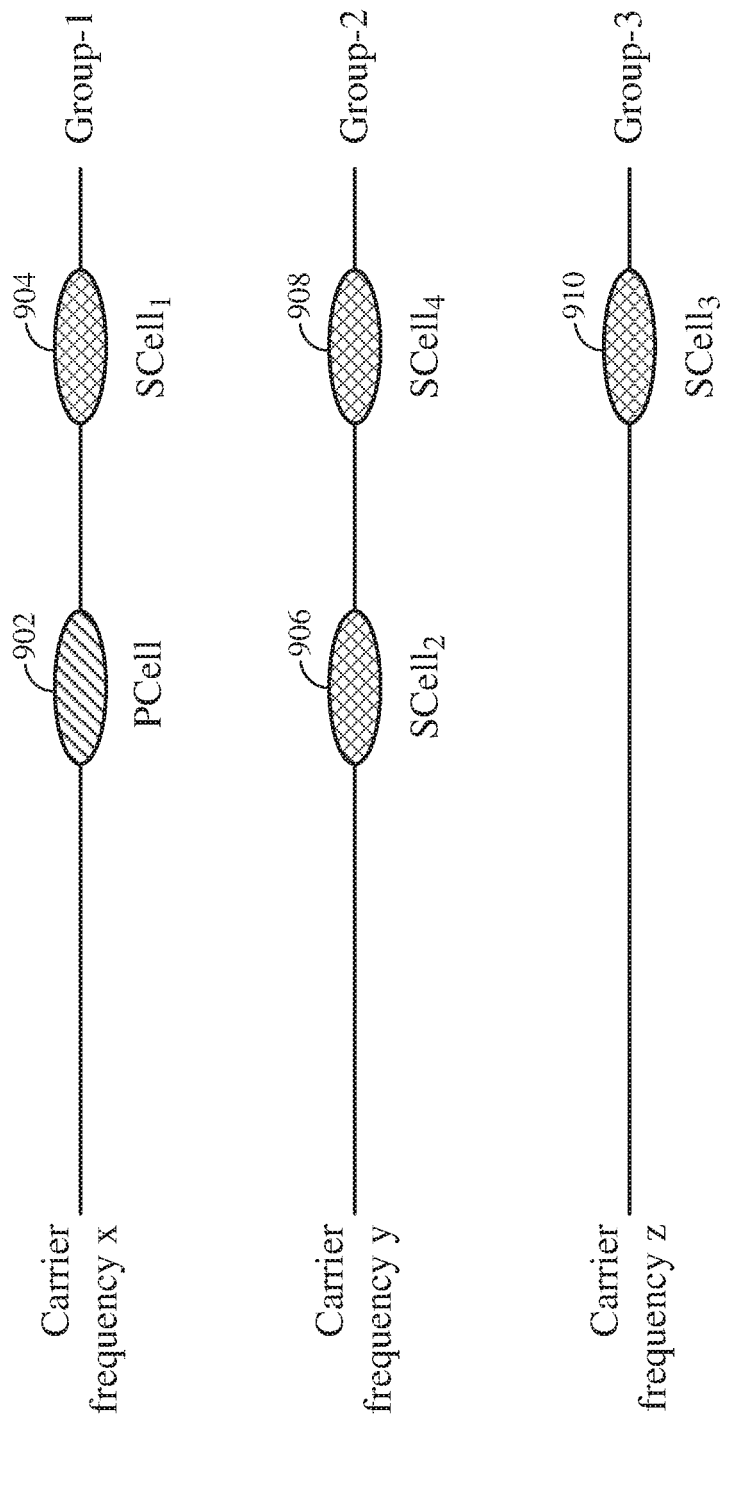
FIG. 9 illustrates grouping of cells over three carriers, in accordance with certain aspects of the present disclosure.

FIG. 9 shows an example of carrier aggregation with five configured cells (or corresponding CCs) 902-910 over three carriers frequencies (of bands) x, y and z.

As shown in FIG. 9 the cells 902-910 include cells that are allocated intra-band (e.g., cells 902-904 within band x, and also 906-908 within band y) and cells that are allocated inter-band (e.g., cells 902-904 in band x, cells 906-908 in band y, and cell 910 in band z). When carrier aggregation is used there are typically a number of serving cells, e.g., one for each CC. The coverage of the serving cells may differ, for example, both due to CC frequencies and from power planning. In certain aspects, certain operations, e.g., RRC connection, is only handled by one cell, the Primary serving cell (Pcell) served by the Primary Component carrier (DL and UL PCC). All other component carriers are referred to as Secondary Component Carriers (DL and UL SCC), serving the secondary serving cells (SSCs). For example, as shown in FIG. 9 the carrier aggregation of the five CCs 902-910 includes only one Pcell 902 and all other cells 904-910 are secondary cells.

In certain aspects, a cell may be defined as one CC (DL or UL), or a combination of one DL CC and one UL CC. The terms CC and cell are used interchangeably in the present disclosure.

In certain aspects, a UE may be configured with multiple CCs (e.g., a PCC and SCC). For example, a UE may be configured with two or more of the CCs 902-910. In certain aspects, indicating a combination of TDD re-configuration indicators of all configured CCs in one DCI may have certain issues. For example, a CC index configuration may be UE specific while dynamic reconfiguration may be common within a UE group. Typically, the same configuration is indicated for and applies to all UEs in a group of UEs. However, the CA configuration is UE-specific and the UE may be configured with different CCs for CA.

Further, in certain aspects, not all configured CCs may be eIMTA capable and/or enabled. In addition, for configured eIMTA enabled cells, only inter-band CCs may have different UL/DL configurations. Thus, CCs of a same band are most likely to use the same UL/DL configuration and CCs of different bands may or may not use different UL/DL configurations.

When carrier aggregation is considered together with eIMTA, certain aspects of the present disclosure discuss techniques for dynamically and efficiently indicating the TDD UL/DL subframe configurations of multiple CCs for eIMTA enabled user.

In certain aspects, cross-carrier indication of UL/DL subframe configuration may be based on a group of CCs instead of one indicator for each CC. FIG. 9 illustrates grouping of cells over the three carriers x, y, and z. As shown in FIG. 9, the five configured cells 901-910 over the three carriers x, y, and z are divided into three groups (from the eNB perspective). As shown, group 1 includes Pcell 902 and Scell1 904, group 2 includes Scell2 906 and Scell4 908, and group 3 includes Scell3 910. A UE may be configured with one or more of these cells 902-910.

In certain aspects, when a UE is configured with N CCs, not all of the N CCs may be eIMTA capable. For instance, if PCC is the macro layer, eIMTA may not be enabled. Further, if the PCC is a FDD CC, eIMTA may not be necessary. Thus, in an aspect, among the N CCs, a set of K CCs may be denoted as eIMTA capable, where K<=N.

In some cases, grouping may only be done for CCs that are eIMTA capable and enabled. For example, the set of K CCs that are eIMTA capable may be grouped into M groups of CCs that are eIMTA enabled. In an aspect, M<=K. Referring to FIG. 9, and example CC grouping may include, a UE 1 configured with two groups {Pcell, Scell1} and {Scell2, Scell4}. The two groups may be named as group 1 and group 2 from UE1's perspective. Another UE 2 may be configured with two groups {Pcell} and {Scell3}. These two groups may also be named group 1 and group 2 from the UE2's perspective.

In certain aspects, the group(s) of CCs may be RRC configured for each UE. For example, when a secondary cell is configured for the UE and it is also eIMTA capable, it may be assigned to a particular group. In an aspect, whether a cell is eIMTA capable or not may be determined before configuration of the secondary cell.

In certain aspects, the grouping of CCs may be linked to whether the CCs belong to the same band or different bands. For instance, all intra-band CCs may belong to the same group, and inter-band CCs may or may not belong to the same group. In certain aspects, by default, if one cell is eIMTA capable then all the other configured CCs in the same band may also be eIMTA capable. In an aspect, since all intra-band CCs belong to the same group the UE may receive one configuration indicator for all CCs in the same frequency band. Further, for intra-band CA, if eIMTA is configured in a subset of serving cells but not all, the UE may assume that the same eIMTA UL/DL configuration is applied to all other serving cells in the band.

In some cases, false alarm detection may be improved by checking whether a set of CCs of the same band have the same configuration or not. If a DCI indicates different configurations for CCs of a same band, a UE may treat it as a falsely detected DCI and hence discard the DCI. In certain aspects, the grouping may also be done for cells of the same frequency, for example, for CoMP scenario 4. In certain aspects, for intra-band CA, if eIMTA is configured in one or multiple serving cells, the UE is not expected to receive different DL HARQ reference configuration for each serving cell.

As noted above, the CCs in the same group may have the same UL/DL subframe configuration at any time. As noted above, the re-configuration indicator of each group of CCs may be included in one explicit re-configuration DCI. For example, a 3-bit indicator may be used for each CC group for indicating the UL/DL subframe configuration for the CC group. For example re-configuration indicators of each group of CCs shown in FIG. 9 may be included in one re-configuration DCI.

In some cases, multiple reconfiguration indicators of L (e.g., L groups) CC groups may be included in the same reconfiguration DCI. In an aspect, the number of CC groups (e.g., L groups) included in one DCI message may not be same as the number of CC groups (M groups) configured for the UE. In alternative aspects, L>=M. For example, the UE may be configured with two CC groups and the DCI may include three CC groups. In this case, the UE may have to monitor only two of the three groups. The UE needs to determine which CC group(s) among the groups included in the DCI is for this UE and the location of its group(s), i.e., ordering of the M groups within the L groups in the DCI message.

In certain aspects, ordering of the M groups for a UE in DCI may be fixed. For example, according to a first alternative, the ordering may be based on the lowest cell index in each group. For instance, if there are two groups, each having two CCs with CC indices in group 1 and 2 being {2,3} and {1,4} respectively, then the ordering based on the lowest cell indices may be group 2 followed by group 1.

According to a second alternative, the ordering of the groups may be based on group indices. Thus, for the same example discussed above, the ordering may be group 1 followed by group 2.

According to a third alternative, the ordering of the groups may be RRC configured. For instance, each group may be assigned with a distinct index in the DCI. In an aspect, a UE may receive a configuration of the M groups of cells (e.g. including ordering of the M groups among L groups in the DCI) from a serving node.

Since CA may be a UE-specific configuration while the configuration indication is group-specific, for the first and second alternatives noted above, some ordering index parameter may be necessary (e.g., configured by higher layer signaling) for a user (e.g., UE) to determine the ordering of the configuration indices of the different CC groups within the DCI message. For example, the location of the reconfiguration indicator of one CC group in the DCI may be determined by associating the user group index with an ordering index. In other words, although CA configuration is UE-specific, the grouping and the indexing is preferably group specific (or cell-specific).

In some cases, the ordering index may be separately configured (e.g. by a serving node or base station) or implicitly derived. In case the ordering index is configured by the serving base station, the UE receives the ordering index from the serving base station. In an aspect, implicit derivation may be based on group index. For example, a UE may be configured with group 1={ }, group 2={CC1}, group 3={ }, group 4={CC2, CC3}. Thus, the UE may determine that the ordering in a DCI is the $2^{nd}$ for group 2 and the $4^{th}$ for group 4. i.e., $2^{nd}$ and $4^{th}$ indicator positions in the DCI. In certain aspects, the UE may be configured with at least one group with a non-empty list of cells. In an aspect, the UE may be configured with at least one group with an empty list of cells. In an aspect, there are at least two cells in the groups of cells. These cells may belong to the same or different carrier frequencies.

Separate configuration may be done for each group. For example, if the UE is configured with two groups, group 1={CC1} and group 2={CC2, CC3}, the UE may be specifically configured or indicated to monitor the $2^{nd}$ position for group 1 and $4^{th}$ position for group 2.

Continuing with the example discussed above with respect to FIG. 9, the two configured groups for the UE2 including group 1-{Pcell} and group 2-{Scell3} from the UE2's perspective are groups 1 and 3 respectively from eNB's perspective. Thus, in this case, the UE needs to be indicated the ordering index for the groups in DCI. Alternatively, the groups for the UE2 may be configured as group 1 and group 3, where group 2 is empty, and the UE2 determines the ordering index based on the group index.

As may be seen from the above example, while group 1 for UE 1 includes two CCs, group 1 for UE 2 includes only one CC. Thus, different UEs may have different interpretations for the same grouping index.

In certain aspects, assuming UE 1 and UE 2 are in the same common DCI with a configuration index $n_j$, the UEs may apply an offset based on the group CC indices to determine the ordering in the DCI. For example, UE 1 may determine the re-configuration indicators for the configured CC group 1 and 2 from the index of $n_j$ and $n_j+1$. UE2 may determine the reconfiguration indicators for the configured CC groups 1 and 3 from index of $n_j$ and $n_j+2$.

Figure 10:
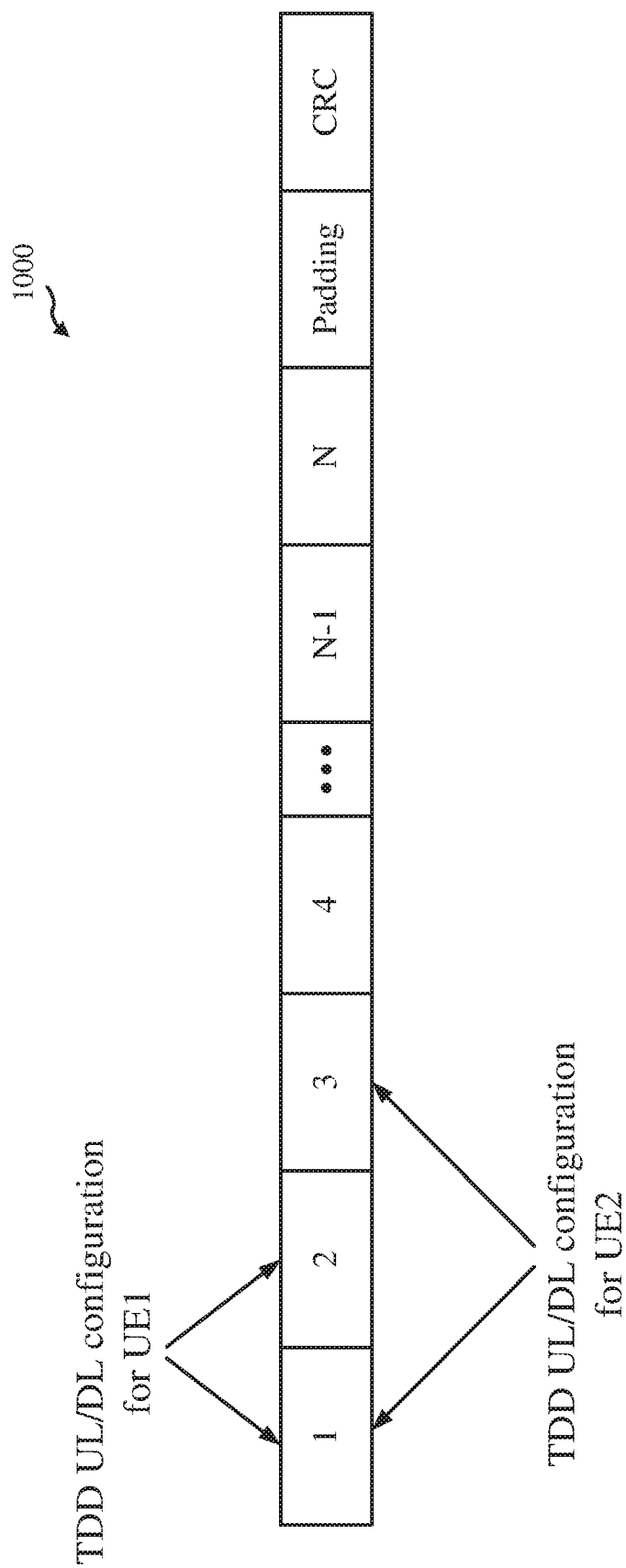
FIG. 10 illustrates the determined positions of the re-configuration indicators for UE1 and UE 2, in accordance with certain aspects of the present disclosure.

As an example, FIG. 10 illustrates the determined positions of the re-configuration indicators for UE1 and UE 2 in the re-configuration DCI 1000, in accordance with certain aspects of the present disclosure. In an aspect the configuration index $n_j$ and/or the offsets may be configured or indicated to the UE. Assuming the value of $n_j$ is 1, UE 1 may determine the positions of its indicators as $n_j=1$ and $n_1+1=2$. Similarly, UE2 may determine the positions of its indicator as $n_j=1$ and $n_j+2=3$.

In certain aspects, a UE may be signaled an index for a cell, wherein the index is mapped to a position, within the DCI message, carrying a UL/DL configuration for a cell or group of cells. In an aspect, the UE may be signaled separate indices for each cell or group of cells indicating, each index indicating a respective position within a DCI message carrying UL/DL configuration for the cell or group of cells. In certain aspects, the UE may be signaled a same index for multiple cells of the same frequency band and/or same cell group, thus indicating the same UL/DL configuration at the same position within the DCI message for the multiple cells. In an aspect, the UE may be signaled different indices for different cells, e.g. cells of different frequency bands and/or different cell groups. In an aspect, the indices signaled to the UE may not be contiguous.

In case of a multi-flow scenario, a UE may monitor two common search spaces (CSS). In that case, the configuration of groups should also be taken into account. For example, CSS1 may have one group of CC1, while CSS2 may have two groups of {CC2, CC3} and CC4. In certain aspects, there may be no overlapping CCs among groups. If the UE receives CC groups configuration where one CC is configured to belong to more than one group, the UE may take it as an error configuration. But if two or more DCIs are supported, and the CC is carried in two groups of different DCIs, it may be possible to have overlapped configurations. In this case, as long as there is only one DCI at a time, the UE may monitor only one DCI per subframe. Thus, at least two groups of cells may include at least one common cell, and the UL/DL configuration for each of the at least two groups of cells is received in a different DCI message.

In certain aspects, in case of FDD-TDD CA and FDD is used in the Pcell, the grouping of CCs may be required for TDD carriers only.

In this case, FDD carriers may also be designated to be eIMTA capable, although not preferred. The transmission of re-configuration indicator for multiple CC groups may have the following options. For example, according to a first alternative, the indicator may be transmitted on FDD CSS but only in a subset of DL subframes {0, 1, 5, 6} which are fixed DL subframes for TDD. According to a second alternative, the indicator may be transmitted on the CSS of one of TDD carrier which is configured as the anchor TDD carrier (e.g., primary carrier).

In certain aspects, a UE may receive a configuration of two or more cells for at least one of carrier aggregation operation, dual-connectivity operation, or coordinated multi-point operation (CoMP), and the UE obtains the UL/DL subframe configuration for a subset of the two or more cells.

Figure 12:
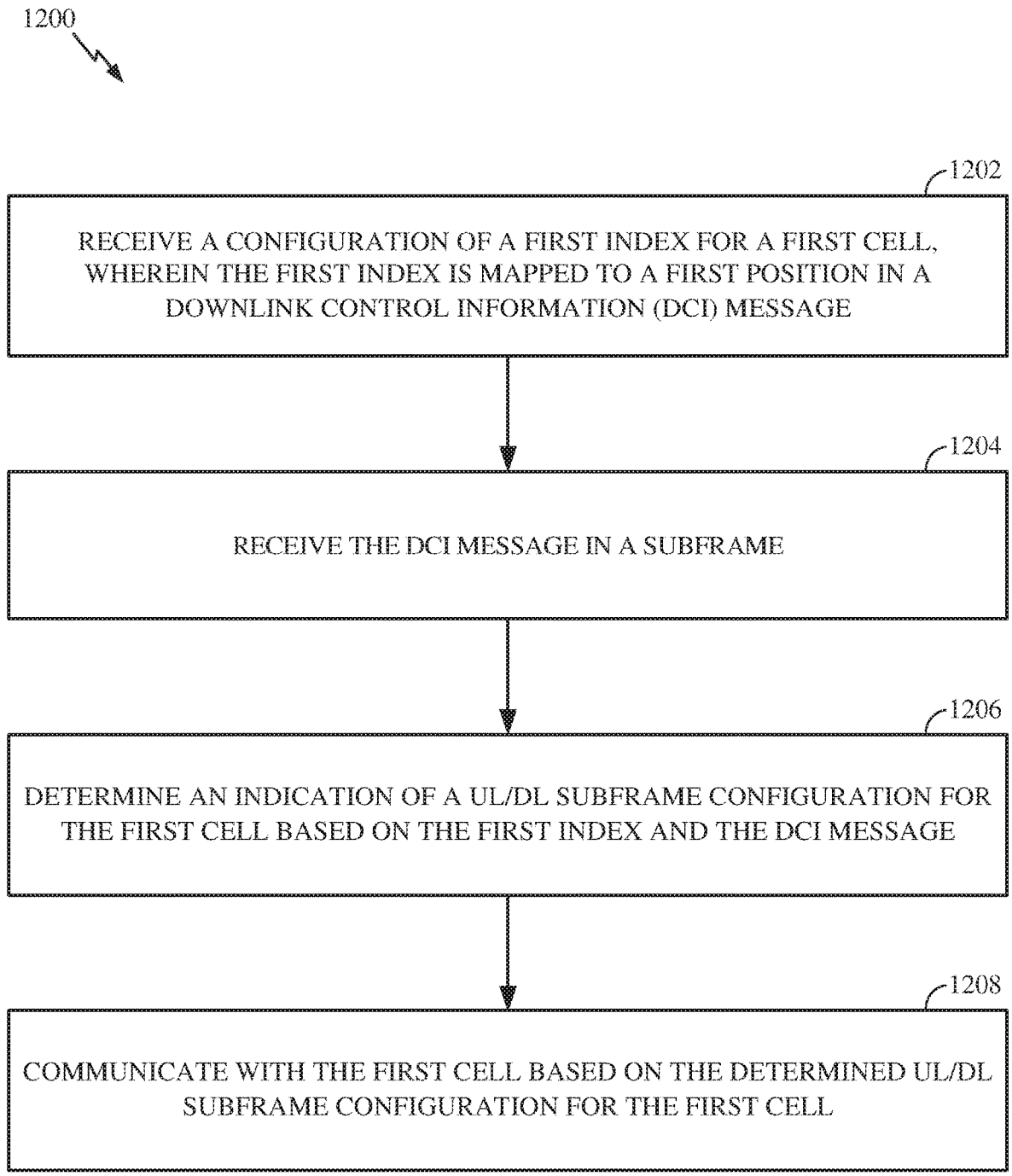
FIG. 12 illustrates example operations 1200 performed, for example, by a BS for cross-carrier indication of UL/DL subframe configuration, in accordance with certain aspects of the present disclosure.

The techniques described above may be summarized by operations 1100 shown in FIG. 11, which represent operations that may be performed by a BS and operations 1200 shown in FIG. 12, which represent corresponding operations that may be performed by a UE.

FIG. 11 illustrates example operations 1100 performed, for example, by a BS for cross-carrier indication of UL/DL subframe configuration, in accordance with certain aspects of the present disclosure. Operations 1100 may begin, at 1102, by generating a Downlink control Information (DCI) message comprising UL/DL subframe configuration information for a first set of groups of cells at different positions within the DCI message. At 1104, the BS may transmit the DCI message to the at least one UE configured to communicate using at least one of the groups of cells.

FIG. 12 illustrates example operations 1200 performed, for example, by a UE for cross-carrier indication of UL/DL subframe configuration, in accordance with certain aspects of the present disclosure. Operations 1200 may begin, at 1202, by receiving a configuration of a first index for a first cell, wherein the first index is mapped to a first position in a Downlink Control Information (DCI) message. At 1204 the UE may receive the DCI message in a subframe. At 1206, the UE may determine an indication of a UL/DL subframe configuration for the first cell based on the first index and the DCI message. At 1208, the UE may communicate with the first cell based on the determined UL/DL subframe configuration for the first cell.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communications by a User Equipment (UE), comprising:
receiving a Downlink Control Information (DCI) message comprising uplink (UL)/downlink (DL) subframe configuration information for a set of cells at different positions within the DCI message;
receiving, at a first position in the DCI message, a configuration of a first index corresponding to a first cell configured for the UE from the set of cells;
receiving an ordering index indicating the first position in the DCI message;
determining an indication of an UL/DL subframe configuration for the first cell based on the first index at the first position in the DCI message as indicated by the ordering index;
receiving a configuration of a plurality of cells, including the first cell, for the UE, wherein the plurality of cells comprises a primary cell and at least one secondary cell;
receiving a second DCI message transmitted on the at least one secondary cell;
determining a UL/DL subframe configuration for at least one of the plurality of cells based on the second DCI message; and
communicating with the first cell and the at least one of the plurality of cells based on the determined UL/DL subframe configurations for the first cell and the at least one of the plurality of cells respectively.

2. The method of claim 1, further comprising determining a UL/DL subframe configuration for at least two of the plurality of cells based on the DCI message transmitted on the primary cell.

3. The method of claim 1, wherein the DCI message is received in a common search space.

4. The method of claim 3, wherein the common search space is monitored by the UE in one or more cells.

5. The method of claim 1, wherein the DCI message is monitored by the UE in a subset of downlink subframes in a cell.

6. The method of claim 1, wherein the first cell supports dynamically changing UL/DL subframe configurations.

7. The method of claim 1, wherein the set of cells comprises one or more groups of cells, wherein all cells of the same group of cells are configured to use the same UL/DL configuration at one time, wherein the first cell is part of a first group of cells configured for the UE, and wherein the first index corresponds to the first group of cells.

8. The method of claim 7, wherein the first group of cells includes a second cell, and wherein the second cell uses the same determined UL/DL subframe configuration.

9. The method of claim 8, wherein the first cell and the second cell are of a same frequency band.

10. The method of claim 8, wherein the first cell and the second cell are indicated to use the same UL/DL subframe configuration at one time.

11. The method of claim 7, further comprising:
receiving a configuration of a second index corresponding to a second group of cells configured for the UE, wherein the first index and the second index are different, wherein a second cell is part of at least the second group of cells.

12. The method of claim 11, wherein the first cell and the second cell are of different frequency bands.

13. The method of claim 11, wherein the first index and the second index are not contiguous.

14. A method for wireless communications by a base station (BS), comprising:
generating a Downlink control Information (DCI) message comprising uplink (UL)/downlink (DL) subframe configuration information for a set of cells at different positions within the DCI message;
configuring a first index corresponding to a first cell configured for at least one UE from the set of cells, wherein the first index is mapped to a first position in the DCI message;
transmitting the configuration of the first index to the at least one UE at the first position in the DCI message;
transmitting an ordering index indicating the first position in the DCI message;
transmitting the DCI message to the at least one UE configured to communicate using the first group of cells;
transmitting a configuration of a plurality of cells, including the first cell, for the at least one UE, wherein the plurality of cells comprises a primary cell and at least one secondary cell; and
transmitting a second DCI message on the at least one secondary cell.

15. The method of claim 14, further comprising:
determining whether a cell supports dynamically changing UL/DL subframe configurations; and
assigning the cell to a group of cells if the cell supports the dynamically changing UL/DL subframe configurations.

16. The method of claim 14, further comprising:
configuring all cells of a same frequency band in a same group of cells.

17. The method of claim 14, further comprising transmitting the DCI message to a second UE, wherein the second UE monitors a set of groups of cells different from the set of groups of cells monitored by the at least one UE.

18. The method of claim 14, wherein the DCI message is transmitted in a common search space.

19. The method of claim 14, wherein the DCI message is monitored by the UE in a subset of downlink subframes in a cell.

20. The method of claim 14, wherein the set of cells comprises one or more groups of cells, wherein all cells of the same group of cells are configured to use the same UL/DL configuration at one time, wherein the first cell is part of a first group of cells configured for the at least one UE, and wherein the first index corresponds to the first group of cells.

21. The method of claim 20,
wherein the first group of cells includes at least a first cell and a second cell, and wherein the first cell and the second cell are on a same frequency band.

22. The method of claim 20, wherein transmitting the DCI message comprises:
transmitting a re-configuration indicator in the DCI message for indicating the UL/DL subframe configuration of each of the groups of cells.

23. The method of claim 20, wherein the first group of cells and a second group of cells are of different frequency bands.

24. An apparatus for wireless communications by a User Equipment (UE), comprising:
means for receiving a Downlink Control Information (DCI) message comprising uplink (UL)/downlink (DL) subframe configuration information for a set of cells at different positions within the DCI message;
means for receiving, at a first position in the DCI message, a configuration of a first index corresponding to a first cell configured for the UE from the set of cells;
means for receiving an ordering index indicating the first position in the DCI message;
means for determining an indication of an UL/DL subframe configuration for the first cell based on the first index at the first position in the DCI message as indicated by the ordering index;
means for receiving a configuration of a plurality of cells, including the first cell, for the UE, wherein the plurality of cells comprises a primary cell and at least one secondary cell;
means for receiving a second DCI message transmitted on the at least one secondary cell;
means for determining a UL/DL subframe configuration for at least one of the plurality of cells based on the second DCI message; and
means for communicating with the first cell and the at least one of the plurality of cells based on the determined UL/DL subframe configurations for the first cell and the at least one of the plurality of cells respectively.

25. The apparatus of claim 24, wherein the set of cells comprises one or more groups of cells, wherein all cells of the same group of cells are configured to use the same UL/DL configuration at one time, wherein the first cell is part of a first group of cells configured for the UE, and wherein the first index corresponds to the first group of cells.

26. The apparatus of claim 25, wherein the first group of cells includes a second cell, and wherein the second cell uses the same determined UL/DL subframe configuration.

27. The apparatus of claim 26, wherein the first cell and the second cell are of a same frequency band.

28. An apparatus for wireless communications by a base station (BS), comprising:
means for generating a Downlink control Information (DCI) message comprising uplink (UL)/downlink (DL) subframe configuration information for a set of cells at different positions within the DCI message;
means for configuring a first index corresponding to a first cell configured for at least one UE from the set of cells, wherein the first index is mapped to a first position in the DCI message;
means for transmitting the configuration of the first index to the at least one UE at the first position in the DCI message;
means for transmitting an ordering index indicating the first position in the DCI message;
means for transmitting the DCI message to the at least one UE configured to communicate using the first group of cells;
means for transmitting a configuration of a plurality of cells, including the first cell, for the at least one UE, wherein the plurality of cells comprises a primary cell and at least one secondary cell; and
means for transmitting a second DCI message on the at least one secondary cell.

29. The apparatus of claim 28, further comprising:
means for determining whether a cell supports dynamically changing UL/DL subframe configurations; and means for assigning the cell to a group of cells if the cell supports the dynamically changing UL/DL subframe configurations.

30. The apparatus of claim 28, wherein the set of cells comprises one or more groups of cells, wherein all cells of the same group of cells are configured to use the same UL/DL configuration at one time, wherein the first cell is part of a first group of cells configured for the at least one UE, and wherein the first index corresponds to the first group of cells.

* * * * *